Dec. 29, 1936. T. L. DUNBAR Re. 20,217
PRODUCTION OF PULP
Original Filed April 16, 1932
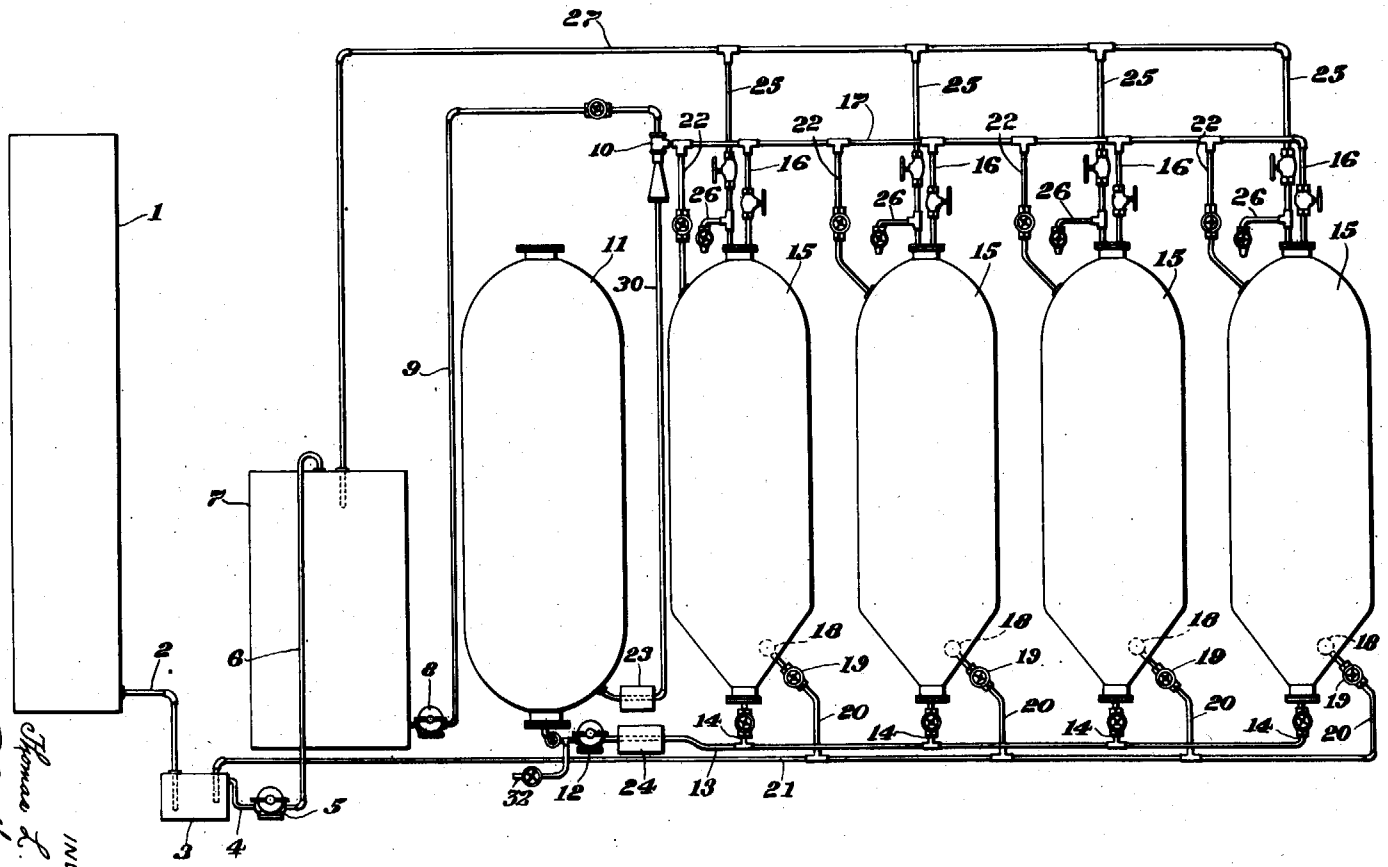
INVENTOR
Thomas L. Dunbar
BY C. E. Hammett, Jr.
ATTORNEY Reissued Dec. 29, 1936 Re. 20,217

UNITED STATES PATENT OFFICE 20,217

PRODUCTION OF PULP

Thomas Leonidas Dunbar, Watertown, N. Y., assignor to Chemipulp Process, Incorporated, Watertown, N. Y., a corporation of New York Original No. 1,901,706, dated March 14, 1933, Serial No. 605,696, April 16, 1932. Application for reissue January 29, 1935, Serial No. 3,983

19 Claims. (Cl. 92—11)

This invention relates to the production of pulp, and in particular to the production of a super-quality sulphite pulp for use in the manufacture of paper.

It is an object of my invention to provide a process capable of producing a sulphite pulp from which may be made sulphite paper of unusually high strength.

A further object is to provide a process for the production of sulphite pulp capable of giving a higher yield of pulp than is obtainable by processes now in use.

Further, it is my object to produce a high-cellulose pulp from which may be made a paper similar to kraft in strength, but more pliable than kraft.

A further object is the provision of a flexible process capable of variation of producing pulp with varying characteristics as may be desired.

A still further object is the provision of a sulphite process by the use of which a saving of acid is effected.

The higher strength of kraft pulp is due primarily to residual lignin which is not removed by the kraft process. While my improved process removes the greater part of this residual lignin and pentosans, in doing so it leaves a cellulose of unusually high strength, thereby imparting highly desirable characteristics to the finished product.

Briefly, in the practice of my improved process the digester is first filled with raw material and bisulphite liquor in accordance with the disclosure of my United States Patents Nos. 1,646,084 and 1,669,234 and Dunbar et al. U. S. Patent No. 1,699,056. A working pressure and temperature sufficient to release extractives from the raw material is then built up and the digester is closed in for a soaking period suitable to the wood conditions as hereinafter pointed out. The bisulphite liquor is then drained from the digester and may be conducted to the acid settling tank or to other parts of the acid system where partially prepared liquor is contacted with liquors from the digester. The raw material is then subjected to a bisulphite cook in accordance with principles hereinafter set forth. At the termination of this cook, the material is subjected to a further treatment with precipitated alkaline water.

The accompanying drawing is a diagrammatic view of apparatus suitable for the practice of my improved process.

In the drawing, 1 is a milk of lime acid tower. This is shown by way of example only, as the applicability of my invention is not limited to the milk of lime system, but is equally applicable to the limestone tower system. 2 is a line leading from the tower 1 to the settling tank 3. From the settling tank, the line 4 leads to the pump 5, which forces the liquor into the acid storage tank 7 through the line 6. The pump 8 forces the liquor from the storage tank 7 through the line 9 to the eductor 10, where it is contacted with relief fluids from the digesters 15. Although four digesters are shown, any number may be used.

The drop or condenser leg 30 leads from the eductor 10 through the exchange heater 23 to the bottom of the accumulator 11. 12 is a pump for forcing the bisulphite liquor into any one of the digesters as required, by means of line 13 and the valved branch filling lines 14. 24 is an exchange heater interposed in the line 13.

16 is a valved branch leading from the top of each digester for venting relief gases and fluids through the header 17 to the eductor 10, while 22 is a valved side relief branch for conducting liquors from the digester to the header 17. The valved branch line 25 leads from the top of the digester to the header 27, which header discharges into the acid storage tank 7. 26 is a valved branch off from the line 25, venting to the atmosphere. The operation of these vent lines has been fully described in my copending application Ser. No. 446,046, now Patent 1,859,384 dated May 24, 1932.

Liquor may be drained from the digesters through the strainer 18, the line 20 having therein the valve 19, and the header 21 leading back to the settling tank 3.

In the practice of my improved process, I may proceed as follows:

The digester having been charged with chips, the valve in the branch 26 is opened and the digester is filled with hot preconditioned bisulphite liquor, heated to a temperature of 40° C. or more, from the accumulator 11 by means of the pump 12, line 13 and valved branch 14, in accordance with the disclosure of my copending application, Ser. No. 446,046. When the digester has been filled, the valve in the branch 26 is closed and a pressure of approximately 50 pounds is applied to the contents of the digester by running the pump 12 until this has been accomplished. The valve in the line 14 is then closed and the pump 12 shut down, and the chips are subjected to a soaking or penetration period under pressure, with all the valves of the digester lines closed.

The duration of this soaking period, as well as the temperature, will vary with the kind and quality of the raw material, and with its initial moisture content, this soaking period being preferably continued until the extractives (by which I mean the so-called "water-solubles") are released from the material and all the raw material is placed in a constant state as regards moisture content. The bisulphite liquor penetrates the chips to some extent, leaving a deposit of acid salts. These soften the encrusting material and the subsequent digestion thereof is expedited. In addition, this initial penetration may partially insulate against too drastic a digestive action in the succeeding stage of the process.

At the termination of this soaking period, the bisulphite liquor is drained out of the digester through the valved line 20 and is returned through the header 21 to the acid settling tank, where it is mixed with partially prepared liquor from the acid system. The liquor is then pumped from the settling tank to the acid storage tank for reuse. Normally, the acid system is operated continuously and therefore the contents of the settling tank are being continuously pumped to the acid storage tank. The extractives contained in the bisulphite liquor drained back to the settling tank are neutralized by an excess of alkaline base in the raw liquor.

After the soaking period has been completed and the liquor has been drained from the digester, the digester is again filled with hot bisulphite liquor, steam is admitted to the digester through a line (not shown) and the cooking is carried on in the usual manner until a large part of the lignin content of the wood is removed. This stage of my improved process differs, however, from the acid cook as practiced in the present single-stage process. In the single-stage process, the extractives, resinous matter and lignin are substantially dissolved out by acid. This produces, particularly toward the end of the cook, chemical compounds which have a deteriorating effect on the fibres. In my improved process the formation of these compounds is to a large extent prevented, due to the fact that upon their appearance in quantities which would injure the cellulose, the cook is stopped, all or a part of the bisulphite liquor is drained from the digester, and the material is then treated in a third stage with precipitated lime (or other suitable alkaline) water.

The length of time required to carry out the second stage of my process is a function of the strength of the liquor and of the temperature employed. Where it is necessary to make short cooks, the maximum temperature employed will be approximately 10° C. higher than will be the case if more time is allowable. If the bisulphite liquor runs relatively high in free $SO_2$, the time required as well as the temperature can be reduced, although when operating with abnormally high free acid content difficulty may be experienced in recovering the acid economically. I have obtained excellent results by operating with a bisulphite liquor of approximately 6% free $SO_2$ and approximately 1.25% combined.

I have found that it is sometimes desirable, in order to produce special grades of pulp, to repeat the cook, or second stage of my process. In this case, a part only of this cook is accomplished with each separate charge of bisulphite liquor and consequently there is a progressive increase in the maximum temperature for each recooking. For example, I have found that in the production of a sulphite pulp with the strength characteristics of a high grade kraft pulp, the cook itself may be carried out in three stages, the maximum temperature during the first being 110° C., during the second approximately 120° C. and during the third approximately 132° C.

After the completion of the cook, the valve 19 is again opened and all or part of the digester liquor is drained back to the settling tank for reuse, the solutes therein being neutralized by the addition of an alkaline liquor. The digester is then filled up (as, for example, by means of the connection 32) with precipitated lime water, and the contents of the digester are boiled or cooked under the heat still remaining in the pulp until the desired pulp is obtained. It is sometimes necessary to add more heat during the lime water cook, and this may be accomplished in the usual manner by admission of steam into the digester, or if the digester is provided with indirect heating coils the contents of the digester may be indirectly heated by the admission of steam to these coils.

After this last cooking with precipitated lime water, the pulp may be blown into a blow pit or other suitable draining medium in the usual manner, viz., normally the blow off valve (not shown) at the bottom of the digester is opened and the contents of the digester are forced out by the pressure existing therein. In some cases it is possible to carry out the alkaline cook in the blow pit or elsewhere, after the stock has left the digester. The liquor that drains off from the blow pit is conducted to settling or clarifying tanks for reuse.

The precipitated lime water has a mildly alkaline reaction and neutralizes any ligno sulphonic acids which may remain in contact with the cellulose fibres after the acid cook. This action produces a much stronger and more pliable pulp than that produced by the single stage acid cook process and gives the pulp many characteristics of kraft pulp which is produced by the alkaline process.

The strength and folding characteristics of the pulp may be varied by varying the point in the digestion process at which the precipitated lime (or other alkaline) water is applied. For example, if a pulp is desired having strength characteristics nearly the same as ordinary sulphite pulp, the second stage, or bisulphite cook, of my process is continued longer and at a higher temperature. If a pulp of much greater strength is desired, this cook is stopped and the acid removed from the digester as soon as deteriorating compounds appear and the lime water cook is continued for a comparatively longer time.

The terms "lime water" and "precipitated lime water" are used in this specification and in the appended claims to refer to a liquor which may or may not contain considerable magnesium in addition to the calcium present.

The applicability of my process is not limited to the spruce, hemlock and fir ordinarily used for the production of sulphite pulp.

By my process I am able to produce a novel sulphite pulp having an unusually high mullen, tear and fold test, but much more pliable than kraft pulp.

I claim:

1. A process for the production of pulp which comprises soaking fibrous material in heated bisulphite liquor under a pressure of approximately 50 pounds until the extractives are substantially removed therefrom and the liquor has penetrated the chips, draining the bisulphite liquor from the fibrous material and mingling said liquor with fresh liquor for reuse, digesting the fibrous material under heat and pressure in bisulphite liquor until the lignin is substantially removed therefrom, withdrawing bisulphite liquor from the material and mingling it with fresh liquor for reuse, and cooking the fibrous material in alkaline liquor until the incrustants of the cellulose are substantially removed.

2. A process for the production of pulp which comprises soaking fibrous material in heated bisulphite liquor under pressure until the extractives are substantially removed therefrom and the material is of uniform moisture content, withdrawing the bisulphite liquor and mingling it with fresh liquor for reuse, digesting the fibrous material in bisulphite liquor under heat and pressure until deteriorating compounds appear and thereupon draining liquor from the material and cooking the material in alkaline liquor.

3. A process for the production of pulp which comprises soaking fibrous material in bisulphite liquor until the extractives are removed therefrom and the liquor has penetrated the chips, draining off the bisulphite liquor and mingling it with fresh liquor for reuse, digesting the fibrous material in bisulphite liquor under heat and pressure to remove lignin therefrom, draining off liquor from the material, and finally cooking the material in precipitated lime water.

4. A process for the production of sulphite pulp which comprises soaking fibrous material in bisulphite liquor, draining off the liquor, digesting said material under heat and pressure in additional bisulphite liquor, and finally cooking said material in alkaline liquor.

5. A process for the production of sulphite pulp which comprises first soaking wood chips in bisulphite liquor under pressure, then cooking the chips in bisulphite liquor under pressure at a temperature above 100° C., and finally cooking in precipitated lime water.

6. In the production of sulphite pulp, charging a digester with fibrous material, filling the charged digester with bisulphite liquor from an accumulator and soaking the fibrous material in the digester under heat and pressure until the extractives are substantially put into solution, withdrawing liquor from the digester and returning it to the accumulator, refilling the digester with bisulphite liquor from the accumulator and digesting the fibrous material in the digester under heat and pressure to remove lignin therefrom, withdrawing liquor from the digester, adding alkaline liquor to the digester and cooking the fibrous material in such alkaline liquor.

7. In the production of sulphite pulp, charging a digester with fibrous material, filling the charged digester with bisulphite liquor and soaking the fibrous material therein under pressure, withdrawing liquor from the digester, refilling the digester with bisulphite liquor and digesting the fibrous material therein under heat and pressure, again withdrawing liquor from the digester, admitting precipitated lime water thereto and cooking the material therein.

8. In a process for the production of pulp, soaking fibrous material in bisulphite liquor under heat and pressure until the extractives are substantially removed therefrom and the liquor has penetrated the chips, draining liquor from the fibrous material, then subjecting the fibrous material to a series of digestion processes in bisulphite liquor under heat and pressure, and finally cooking the fibrous material in alkaline liquor.

9. In a process for the production of pulp, soaking fibrous material in bisulphite liquor under heat and pressure until the extractives are substantially removed therefrom, then subjecting the fibrous material to a series of digestion processes under pressure and at successively higher temperatures, and finally cooking the fibrous material in alkaline liquor.

10. In a process for the production of pulp, charging a digester with fibrous material and soaking said material therein in bisulphite liquor under heat and pressure to remove extractives therefrom, withdrawing liquor from the digester, refilling the digester with bisulphite liquor and digesting the fibrous material therein under heat and pressure to remove lignin therefrom, discharging the fibrous material from the digester and thereafter cooking the fibrous material in alkaline liquor.

11. A process for the production of sulphite pulp which comprises first soaking fibrous material in bisulphite liquor under heat and pressure until extractives are substantially removed therefrom and the material is of uniform moisture content, then digesting the fibrous material in bisulphite liquor under heat and pressure until the formation of ligno sulphonic acid reaches a point deleterious to the material, and finally cooking the fibrous material in alkaline liquor until the incrustants of the cellulose are substantially removed therefrom.

12. Sulphite pulp obtained by soaking fibrous material in heated bisulphite liquor under pressure until the extractives are substantially put into solution and the bisulphite has penetrated the fibrous material, withdrawing said liquor, cooking the material in fresh bisulphite liquor under heat and pressure, withdrawing said liquor, and cooking the material in alkaline liquor.

13. A process for the production of pulp which comprises charging a digester with fibrous material, introducing hot acid liquor to the digester while venting air therefrom, sealing the digester and forcing in additional quantities of the hot liquor to establish a high hydrostatic pressure on the liquor; maintaining the hot high pressure liquid in contact with the material until such liquid has substantially completely penetrated the material, then draining the liquor from the sealed digester; introducing another batch of hot digestion liquor to the digester and raising the mass to reaction temperatures.

14. A process for the production of pulp which comprises charging a digester with fibrous material, establishing a body of hot liquor in a separate receptacle, introducing the hot liquor from the receptacle into the digester while venting air from the digester, sealing the digester and forcing in additional quantities of the hot liquor to establish a high hydrostatic pressure on the liquor; maintaining the hot high pressure liquor in contact with the material until the liquor has penetrated the material, then draining the liquor from the bottom portion of the digester, while maintaining the upper portion of the digester sealed, mixing such drained liquor with fresh liquor for reuse; admitting further quantities of hot liquor from the receptacle into the digester and raising the mass to reaction temperatures.

15. A process for the production of pulp which comprises soaking fibrous material in heated bisulphite liquor under a pressure of the order of fifty pounds, maintaining the liquor in contact with the material until it has substantially completely penetrated the material, then draining the liquor from the material, while preventing access of air to the material, subsequently contacting the soaked material with additional quantities of hot liquor and raising the liquor to reaction temperatures.

16. A method of treating fibrous material which comprises introducing a mass of the material to a digester, forcing a quantity of hot digestion liquor into the digester while displacing air from the upper part of the digester, sealing the upper part of the digester and forcing in additional quantities of the hot liquor until a high hydrostatic pressure is established on the liquor; maintaining the hot high pressure liquor in contact with the material for a period of time sufficiently long to effect saturation of the material, and to extract certain of the constituents of the material, then withdrawing the liquor from the bottom of the digester while maintaining the top sealed, admitting fresh hot digestion liquor into the bottom of the digester and then raising the mass to reaction temperatures.

17. In the digestion of fibrous material, charging a digester with fibrous material, then admitting a hot digesting liquor while expelling air from the digester, sealing the digester after the expulsion of the air and admitting additional quantities of the liquor to establish a high hydrostatic pressure on the liquor; maintaining the fibrous material in contact with the liquor until it is saturated thereby; then draining the excess liquor from the digester and admitting fresh hot liquor, and cooking the fibrous material in such fresh liquor.

18. In the digestion of fibrous material, charging a digester with fibrous material, admitting hot acid liquor to the digester while expelling air therefrom, forcing in a sufficient volume of the liquor to establish a hydrostatic pressure of the order of fifty pounds, maintaining the liquor in contact with the material until the extractives are solubilized and the material is permeated with the liquor, then draining the excess liquor from the digester and admitting fresh hot liquor and digesting the material in such fresh liquor at elevated temperature and pressure.

19. In the digestion of fibrous material, charging a digester with fibrous material, admitting hot acid liquor, to the bottom of the digester while displacing air from the top of the digester; sealing the top of the digester after the expulsion of air and forcing in additional quantities of the hot liquor to establish a hydrostatic pressure of the order of fifty pounds on the liquor; maintaining the hot high pressure liquor in contact with the fibrous material until such material is saturated; then draining the liquor from the bottom of the digester while maintaining the top sealed and after such drainage introducing fresh hot acid liquor to the digester and cooking the material under cooking temperature and pressure.

THOMAS LEONIDAS DUNBAR.